United States Patent
Kato

(10) Patent No.: US 10,907,995 B2
(45) Date of Patent: Feb. 2, 2021

(54) ELECTROMAGNETIC INDUCTIVE ENCODER

(71) Applicant: Mitutoyo Corporation, Kanagawa (JP)

(72) Inventor: Yoshiaki Kato, Chiba (JP)

(73) Assignee: MITUTOYO CORPORATION, Kawasaki (JP)

( * ) Notice: Subject to any disclaimer, the term of this patent is extended or adjusted under 35 U.S.C. 154(b) by 55 days.

(21) Appl. No.: 16/405,107

(22) Filed: May 7, 2019

(65) Prior Publication Data
US 2019/0346293 A1 Nov. 14, 2019

(30) Foreign Application Priority Data
May 9, 2018 (JP) ................................. 2018-090742

(51) Int. Cl.
*G01D 5/249* (2006.01)
*G01D 5/20* (2006.01)

(52) U.S. Cl.
CPC ............. *G01D 5/2497* (2013.01); *G01D 5/20* (2013.01)

(58) Field of Classification Search
CPC ........ G01D 5/249; G01D 5/2497; G01D 5/20; G01D 5/204; G01D 5/2046; G01D 5/2053; G01D 5/2086; G01D 5/244; G01D 5/24438; G01D 5/245; G01D 5/347; G01D 5/34707; G01D 5/34715; G01D 5/34784; G01D 5/34792; G01D 5/2454

See application file for complete search history.

(56) References Cited

U.S. PATENT DOCUMENTS

| | | | | |
|---|---|---|---|---|
| 6,157,188 A | * | 12/2000 | Steinke | ................ G01B 7/003 324/207.17 |
| 2002/0030484 A1 | * | 3/2002 | Kiriyama | ............ G01D 5/2086 324/207.17 |

FOREIGN PATENT DOCUMENTS

JP 2004-309435 11/2004

* cited by examiner

*Primary Examiner* — Son T Le
(74) *Attorney, Agent, or Firm* — Rankin, Hill & Clark LLP

(57) ABSTRACT

There is provided an electromagnetic inductive encoder that allows reduction in the number of tracks on a scale for reduction in the size of the scale. The electromagnetic inductive encoder includes a scale having a scale pattern, a head, and computation unit. The head includes transmission unit, which includes transmission coils, and reception unit, which includes reception coils. The scale pattern has a first pattern, which causes the reception coils to receive positive current, and a second pattern, which causes the reception coils to receive negative current. The computation unit includes a determination unit, which, when the positive current is detected, determines that the current is associated with the first pattern, and, when the negative current is detected, determines that the current is associated with the second pattern, a signal generation unit, which generates a signal formed of "1" representing the first pattern and "0" representing the second pattern based on the result of the determination, and a position calculation unit, which calculates the position of the head based on the signal generated by the signal generation unit.

9 Claims, 8 Drawing Sheets

ELECTROMAGNETIC INDUCTIVE ENCODER

CROSS-REFERENCE TO RELATED APPLICATION

This non-provisional application claims priority under 35 U.S.C. § 119(a) from Japanese Patent Application No. 2018-90742, filed on May 9, 2018, the entire contents of which are incorporated herein by reference.

BACKGROUND

Technical Field

The present invention relates to an electromagnetic inductive encoder.

BACKGROUND ART

There has been a known electromagnetic inductive encoder including a scale having scale patterns provided along a measurement direction, a head that faces the scale and moves relative thereto in the measurement direction, and computation unit for computing a signal based on the relative movement between the scale and the head. The head includes transmission unit including a transmission coil that transmits a magnetic flux to the scale patterns to cause them to produce electromotive current and reception unit including a reception coil that receives, in the form of current, changes in the magnetic flux created by the electromotive current and sent from the scale patterns.

The electromagnetic inductive encoder is used in a caliper, a micrometer, an indicator, a linear scale, a linear gauge, and other tools.

As the electromagnetic inductive encoder, for example, the electromagnetic inductive transducer (electromagnetic inductive encoder) described in Japanese Patent Laid-Open NO. 2004-309435 includes a scale on which a large number of wiring patterns (scale patterns) are juxtaposed along a measurement axis direction (measurement direction) and a read head (head) that faces the scale and moves relative thereto in the measurement axis direction. The scale has a plurality of tracks formed of juxtaposed wiring patterns.

The wiring patterns each serve as a coil (patterned coil) and include a first loop section, a second loop section, and a connection loop section that connects the first loop section and the second loop section to each other, and the first loop section, the second loop section, and the connection loop section are formed on a scale surface on which the wiring patterns are juxtaposed and in an orthogonal direction orthogonal to the measurement axis direction. The loop sections include a first small loop, a second small loop, and a connection small loop that connects the first small loop and the second small loop to each other, respectively, and the small loops are so formed in the loop sections as to be smaller than the loop portions. Each of the loop sections and the corresponding small loop are separate from each other by a gap.

The wiring patterns are so formed that the gap between each of the loop sections and the corresponding small loop in the measurement axis direction is wider than the gap between the loop section and the corresponding small loop in the orthogonal direction. The wiring patterns are further so formed that the width of each of the loop sections in the orthogonal axis direction is smaller than the width of the loop section in the measurement direction.

The thus configured electromagnetic inductive transducer allows reduction in size of the scale because the scale can be so formed that the size thereof in the orthogonal direction is smaller than the size in related art.

SUMMARY OF THE INVENTION

Problems to be Solved by the Invention

However, to calculate the absolute position of the read head relative to the scale, the electromagnetic inductive transducer needs to include a scale having a plurality of tracks formed of wiring patterns that are each an incremental pattern.

An incremental system (INC system) and an absolute system (ABS system) have been known as a method for detecting the position of the read head relative to the scale.

The INC system is a system for continuously detecting incremental patterns (INC patterns) provided at fixed intervals on the scale and counting up or down the number of INC patterns that pass the read head to detect the relative positions of the scale and the read head.

The ABS system is a system for combining a plurality of incremental signals (INC signals) detected from a plurality of tracks having INC patterns provided at different intervals with one another to calculate the absolute position of the read head relative to the scale. As another ABS system, there is a system for detecting absolute patterns (ABS patterns) provided at random on a scale and analyzing the ABS patterns to calculate the absolute position of the read head relative to the scale.

Since it is difficult to form ABS patterns provided at random on the scale in an electromagnetic inductive transducer, the absolute position of the read head relative to the scale is typically calculated by combining the INC signals with one another. Therefore, to calculate the absolute position of the read head relative to the scale, a plurality of tracks are necessary instead of one track. The increase in the number of tracks causes a problem of an increase in the size of the scale.

An object of the present invention is to provide an electromagnetic inductive encoder that allows reduction in the number of tracks on a scale for reduction in the size of the scale.

Means for Solving the Problems

An electromagnetic inductive encoder according to the present invention includes a scale that has a scale pattern provided along a measurement direction, a head that faces the scale and moves relative thereto in the measurement direction, and computation unit for computing a signal based on the relative movement between the scale and the head. The head includes transmission unit including a transmission coil that transmits a magnetic flux to the scale pattern to cause the scale pattern to produce electromotive current and reception unit including a reception coil that receives, in a form of current, a change in the magnetic flux created by the electromotive current and sent from the scale pattern. The scale pattern has a first pattern that causes the reception coil to receive positive current flowing in a predetermined direction and a second pattern that differs from the first pattern and causes the reception coil to receive negative current flowing in a direction opposite the predetermined direction. The computation unit includes a determination unit that, when the positive current is detected, determines that the current is associated with the first pattern, and, when the negative current is detected, determines that the current is associated with the second pattern, a signal generation unit that generates a signal formed of "1" representing the first pattern and "0" representing the second pattern based on a result determined by the determination unit, and a position calculation unit that calculates a position of the head based on the signal generated by the signal generation unit.

According to the present invention described above, the determination unit can, when the positive current is detected from the scale pattern, determine that the current is associated with the first pattern, and, when the negative current is detected therefrom, determine that the current is associated with the second pattern. The signal generation unit can generate a signal formed of "1" representing the first pattern and "0" representing the second pattern based on the result of the determination. The position calculation unit can calculate the position of the head based on the signal. That is, the electromagnetic inductive encoder can acquire the signal formed of "1" and "0" from one track formed of the scale pattern, which has the first pattern and the second pattern, juxtaposed in the measurement direction.

An ABS system calculates the absolute position by analyzing the combination of "1" and "0" (pseudo-random code) carried by the signal formed of a plurality of "1" and "0". The Pseudo-random code is a predetermined code, formed, for example, of randomly provided "1" and "0", and the absolute position can be calculated by analyzing the code. Examples of the pseudo-random code include an M-sequence code, a Gold-sequence code, and a Barker-sequence code according to the analysis method and the kind of code.

In the ABS system, the scale patterns are, for example, so disposed across the overall length of one track as to express the absolute position in accordance with a pseudo-random code. The combination of "1" and "0" in the signal formed of the plurality of "1" and "0" that the reception unit receives at the same time from the scale patterns varies in accordance with the position on one track. The electromagnetic inductive encoder can therefore calculate the absolute position of the head relative to the scale by analyzing the combination of "1" and "0" in the signal formed of the plurality of "1" and "0".

Therefore, in this case, since the electromagnetic inductive encoder can calculate the absolute position from one track, the number of tracks on the scale can be reduced, whereby the size of the scale can be reduced. Further, the reduction in size of the scale allows cost reduction.

Further, for example, in a case where the first pattern and the second pattern are alternately disposed along one track, the thus disposed first and second patterns can form an INC pattern. The electromagnetic inductive encoder can therefore operate based on the INC system.

Further, for example, an ABS-system area where the first and second patterns are so disposed as to express the absolute position in accordance with a pseudo-random code in correspondence with the ABS system and an INC-system area where the first and second patterns are alternately disposed in correspondence with the INC system can be formed on one track. That is, on one track, ABS-system areas can be formed in opposite-end positions and an INC-system area can be formed in a middle position, or an ABS-system area and an INC-system area can be alternately disposed.

The electromagnetic inductive encoder therefore allows improvement in flexibility of the scale design.

It is preferable that the scale pattern is formed of a plurality of scale patterns, that the transmission unit transmits a magnetic flux to a plurality of the scale patterns to cause the scale patterns to produce electromotive current, that the reception unit receives, in the form of current, changes in the magnetic flux created by the electromotive current and sent from the plurality of scale patterns, and the scale patterns are so disposed that the first and second patterns express an absolute position in accordance with a pseudo-random code.

According to the configuration described above, since the transmission unit transmits a magnetic flux to the plurality of scale patterns to cause them to produce electromotive current, and the reception unit receives, in the form of current, changes in the magnetic flux created by the electromotive current and sent from the plurality of scale patterns, the reception unit can receive, in the form of current, a plurality of changes in the magnetic flux from the plurality of scale patterns at the same time. The electromagnetic inductive encoder can then acquire the pseudo-random code formed of a plurality of "1" and "0" and calculate the absolute position by analyzing the signal formed of the pseudo-random code, as described above.

Therefore, since the electromagnetic inductive encoder can calculate the absolute position from one track, the number of tracks on the scale can be reduced, whereby the size of the scale can be reduced.

It is preferable that the transmission coil is so disposed along the measurement direction as to extend over the scale patterns, that a plurality of the reception coils so disposed along the measurement direction as to correspond to the scale patterns and juxtaposed with the transmission coil on a surface where the transmission coil is disposed and in an orthogonal direction orthogonal to the measurement direction, that the first and second patterns each include a transmission-side patterned coil that is formed of a coil wire in a ring shape and so disposed as to face the transmission coil and a reception-side patterned coil that is formed of a coil wire in a ring shape and so disposed as to face the reception coils, that the first pattern is formed by connecting the coil wire of the transmission-side patterned coil to the coil wire of the reception-side patterned coil to form the transmission-side patterned coil and the reception-side patterned coil in a substantially 8-letter shape, and that the second pattern is formed by connecting the coil wire of the transmission-side patterned coil to the coil wire of the reception-side patterned coil to form a substantially 0-letter shape (or single annular shape). Such substantially 0-letter shape may be formed by connecting the transmission-side patterned coils and the reception-side patterned coil in a substantially 8-letter shape and removing the regions where the transmission-side patterned coils are connected to the reception-side patterned coil.

According to the configuration described above, the first pattern is formed in a substantially 8-letter shape in which part of the coil wire of the transmission-side patterned coil is connected to part of the coil wire of the reception-side patterned coil. In the configuration described above in which the patterned coils are partially connected to each other, the reception-side patterned coil in the first pattern is affected at the connection region by current flowing through the transmission-side patterned coil, so that current flows through the reception-side patterned coil in the direction opposite the direction in which the current flows through the transmission-side patterned coil.

The second pattern is formed in a substantially 0-letter shape in which the coil wire of the transmission-side patterned coil is connected to the coil wire of the reception-side patterned coil with the region where the coil wires are connected to each other removed. In the connection configuration described above, in which the region corresponding to the region where the patterned coils in the first pattern are connected to each other is removed, the current flowing through the reception-side patterned coil, which has no region affected by the current flowing through the transmission-side patterned coil, flows in the same direction in which the current flows through the transmission-side patterned coil.

That is, the configuration described above causes the orientation of the current flowing through the reception-side patterned coil in the first pattern to differ from the orientation of the current flowing through the reception-side patterned coil in the second pattern. The first pattern causes the reception coils to receive the positive current flowing in the predetermined direction, and the second pattern causes the reception coils to receive the negative current flowing in the direction opposite the predetermined direction. The electromagnetic inductive encoder therefore allows easy implementation of the first pattern, which causes the reception coils to receive the positive current flowing in the predetermined direction, and the second pattern, which causes the reception coils to receive the negative current flowing in the direction opposite the predetermined direction.

It is preferable that the transmission coil and the reception coils are alternately juxtaposed along the orthogonal direction.

The configuration described above, in which the transmission coils and the reception coils are alternately juxtaposed along the orthogonal direction, for example, in the first pattern, causes the transmission-side patterned coil and the reception-side patterned coil to be alternately juxtaposed in correspondence with the alternate juxtaposition of the transmission coils and the reception coils. In this case, for example, the region where the transmission-side patterned coil or the reception-side patterned coil is connected is formed of two regions. The influence of the current flowing through the transmission-side patterned coil or the reception-side patterned coil therefore increases, as compared with a case where there is one connection region. An increase in the number of transmission-side patterned coils facing the transmission coil increases the electromotive current, and an increase in the number of reception-side patterned coils facing the reception coils increases the magnetic flux that the reception coils can receive, whereby the reception coils readily receive the magnetic flux.

Similarly, in the case of the transmission-side patterned coil or the reception-side patterned coil in the second pattern, an increase in the number of transmission-side patterned coils facing the transmission coil increases the electromotive current, and an increase in the number of reception-side patterned coils facing the reception coils increases the magnetic flux that the reception coils can receive, whereby the reception coils readily receive the magnetic flux. The electromagnetic inductive encoder therefore has improved signal efficiency.

It is preferable that the transmission coil and the reception coils are alternately so juxtaposed along the orthogonal direction that the total number thereof is odd, and that the transmission-side patterned coil and the reception-side patterned coil are alternately so connected to each other along the orthogonal direction that the total number thereof is odd.

According to the configuration described above, the arrangement of the transmission coil and the reception coils, for example, causes the transmission-side patterned coil to be sandwiched between the reception-side patterned coils and the reception-side patterned coil to be sandwiched between the transmission-side patterned coils. The reception coils can therefore receive an increased amount of magnetic flux or receive the magnetic flux at least two locations. The electromagnetic inductive encoder therefore has improved signal efficiency.

It is preferable that the transmission-side patterned coil and the reception-side patterned coil are so connected to each other along the orthogonal direction as to match with the transmission coil and the reception coils in terms of number.

According to the configuration described above, since the transmission-side patterned coil and the reception-side patterned coil are so connected to each other along the orthogonal direction as to match with the transmission coil and the reception coils in terms of number, the arrangement of the transmission-side patterned coil and the reception-side patterned coil can be readily designed.

It is preferable that the scale patterns are so disposed that the first pattern and the second pattern express the absolute position in accordance with an M-sequence code.

According to the configuration described above, since the scale patterns are so disposed that the first pattern and the second pattern express the absolute position in accordance with an M-sequence code, the electromagnetic inductive encoder can readily calculate the absolute position, as compared with a case where any other pseudo-random code is used.

DETAILED DESCRIPTION OF THE EMBODIMENTS

First Embodiment

A first embodiment of the present invention will be described below with reference to FIGS. 1 to 6.

Figure 1:
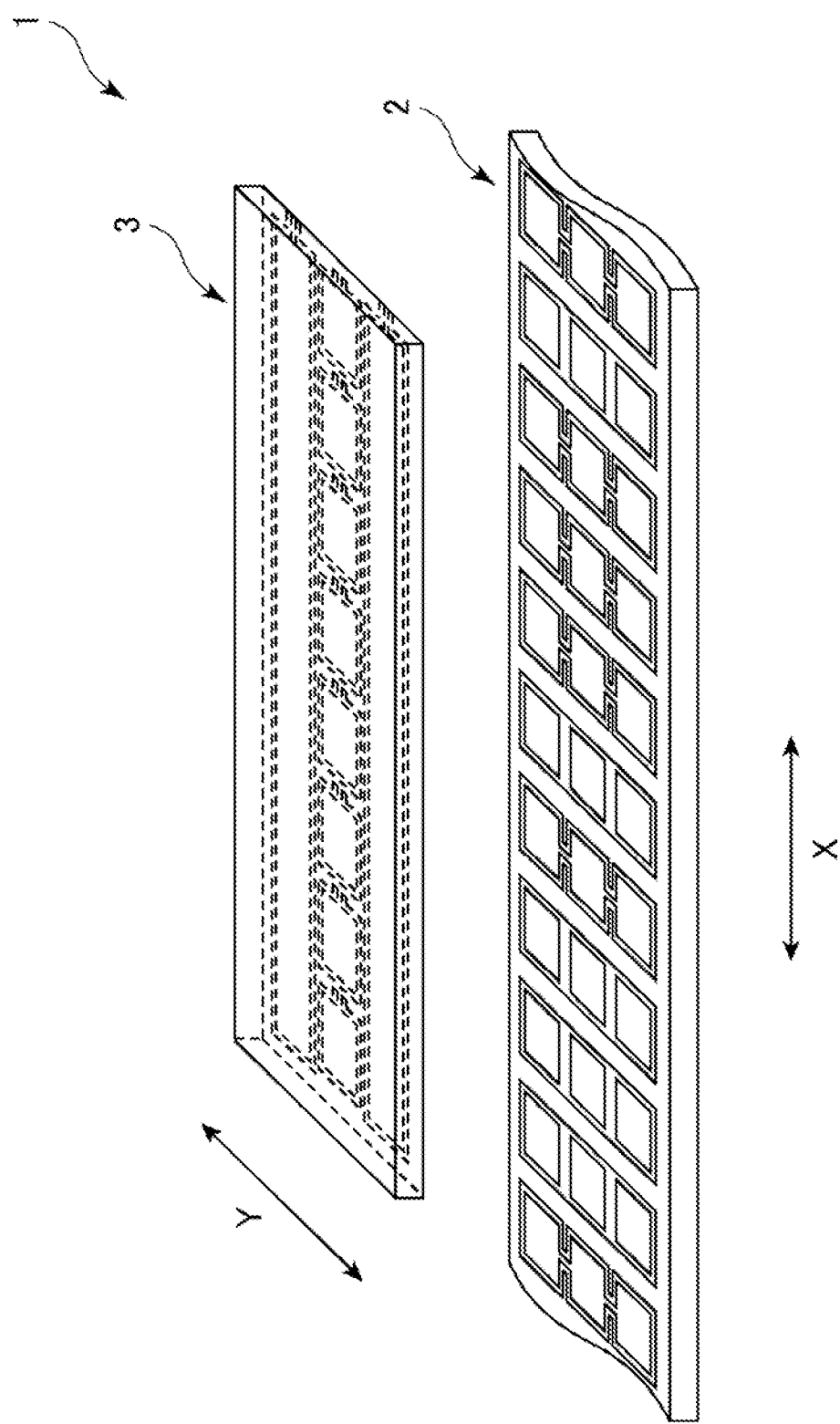
FIG. 1 is a perspective view showing an electromagnetic inductive encoder according to a first embodiment of the present invention.

FIG. 1 is a perspective view showing an electromagnetic inductive encoder according to the first embodiment of the present invention.

An electromagnetic inductive encoder 1 includes a scale 2, which has scale patterns provided along a measurement direction, and a head 3, which faces the scale 2 and moves relative thereto in the measurement direction, as shown in FIG. 1. The electromagnetic inductive encoder 1 is a linear encoder used in a linear scale, which is a measurement tool that is not shown.

The electromagnetic inductive encoder 1 is provided in the linear scale. The linear scale moves the head 3 relative to the scale 2 in a direction X, which is the measurement direction, detects the position of the head relative to the scale 2 by using induced current, and outputs the result of the detection to a display section that is not shown.

In the following description and drawings, the direction in which the head 3 moves (measurement direction), which is the longitudinal direction of the scale 2, is called the direction X, and the width direction of the scale 2, which is the orthogonal direction orthogonal to the direction X, is called a direction Y in some cases.

Figure 2:
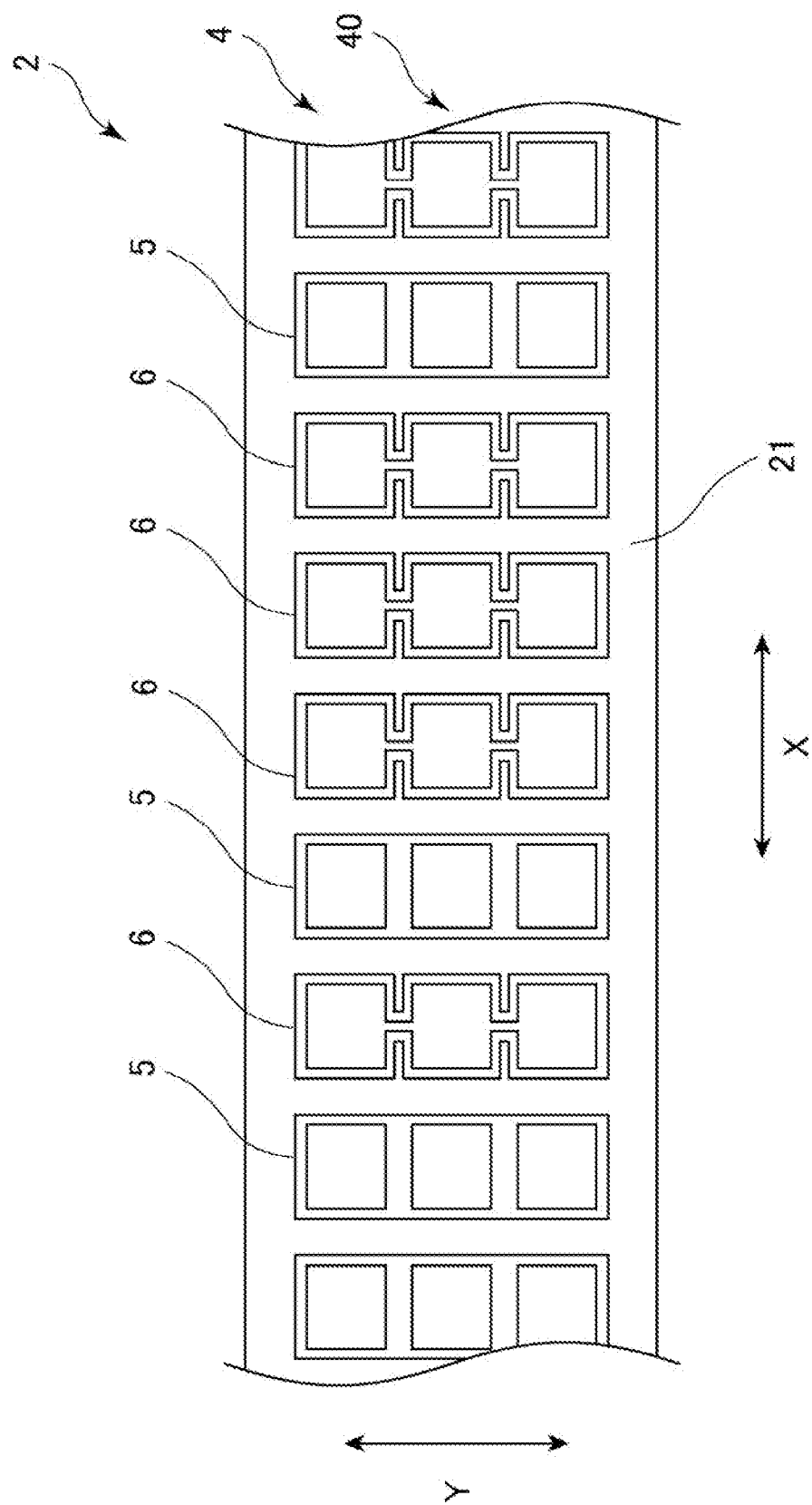
FIG. 2 is a top view showing a scale according to the first embodiment of the present invention.

FIG. 2 is a top view showing the scale according to the first embodiment of the present invention.

The scale 2 includes an insulating substrate 21, which is made of a glass epoxy resin and has an elongate shape, and scale patterns 4, which are so provided as to face the head 3, as shown in FIG. 2. The insulating substrate 21 may instead be made of glass, silicon, or any other material instead of a glass epoxy resin.

The scale patterns 4 are made of a material having small electrical resistance, such as aluminum, copper, and gold, and are each formed of a linear conductor. The scale patterns 4 each include a first pattern 5, which is formed in the shape of a ladder, and a second pattern 6, which is formed in the shape of a ring. The first patterns 5 and the second patterns 6 are juxtaposed along the direction X to form a single track 40. The first patterns 5 and the second patterns 6 are so disposed as to express the absolute position in accordance with an M-sequence code, which is a pseudo-random code, in a case where the first pattern 5 represents "1" and the second pattern 6 represents "0", as will be described later.

Figure 3:
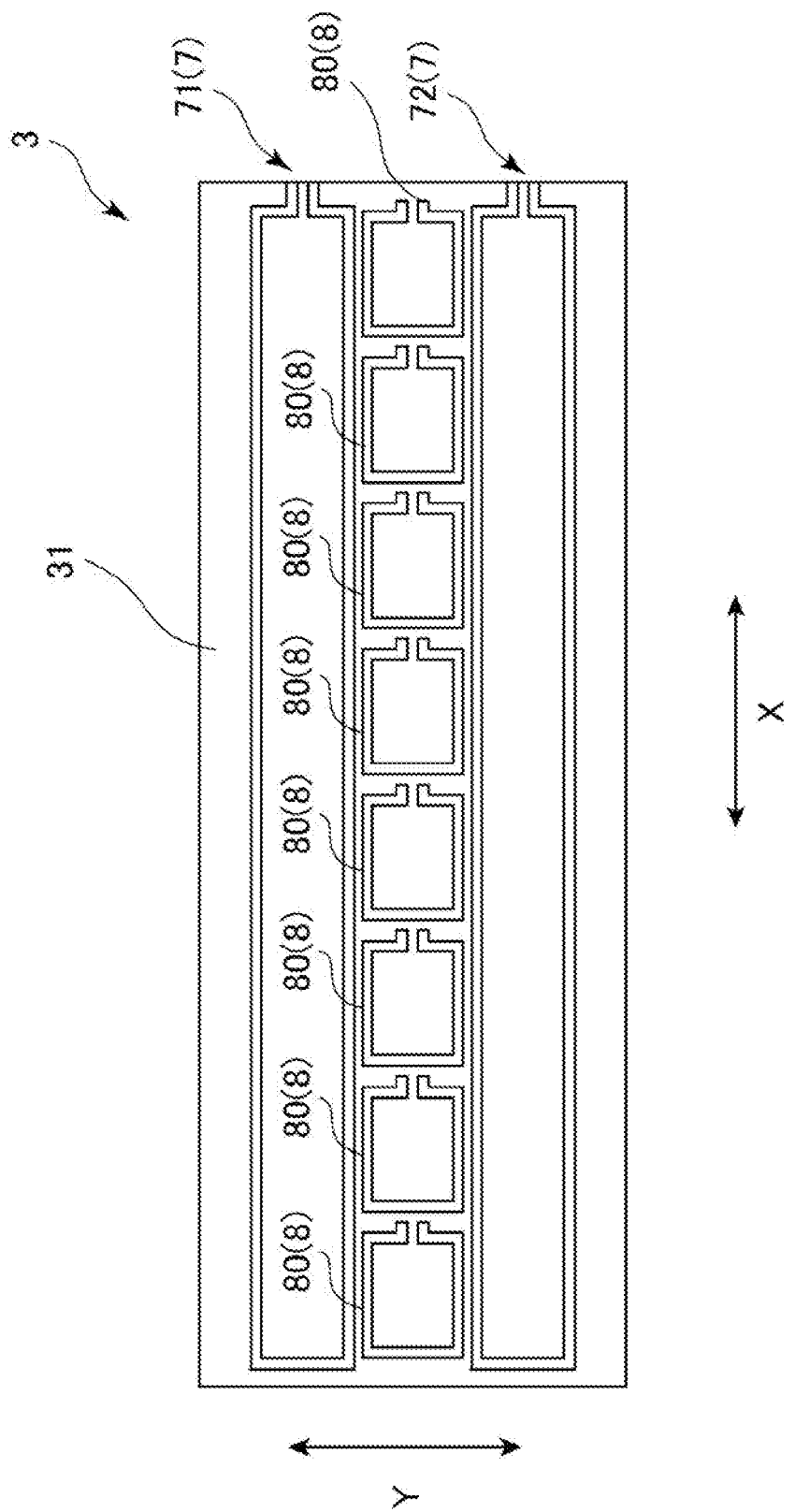
FIG. 3 is a top view showing a head according to the first embodiment of the present invention.

FIG. 3 is a top view showing the head according to the first embodiment of the present invention.

The head 3 includes transmission unit 7 and reception unit 8 on an insulating substrate 31, which is a multilayer substrate and is made of a glass epoxy resin, as shown in FIG. 3. The transmission unit 7 includes transmission coils 71 and 72, which transmit magnetic fluxes to the scale patterns 4 (see FIG. 2) to cause them to produce electromotive current, and the reception unit 8 includes reception coils 80, which receive, in the form of current, changes in the magnetic fluxes created by the electromotive current and sent from the scale patterns 4. The insulating substrate 31 may be made of glass, silicon, or any other material instead of a glass epoxy resin.

The transmission coils 71 and 72 are made of a material having small electrical resistance, such as aluminum, copper, and gold, and so disposed along the direction X as to extend over the scale patterns 4. Therefore, in the present embodiment, the transmission coils 71 and 72 transmit magnetic fluxes to eight scale patterns 4 at the same time to cause them to produce electromotive current.

The plurality of reception coils 80 are made of a material having small electrical resistance, such as aluminum, copper, and gold, so disposed along the direction X as to correspond to the scale patterns 4, and juxtaposed with the transmission coils 71 and 72 on the surface where the transmission coils 71 and 72 are disposed and in the orthogonal direction orthogonal to the direction X (direction Y). In the present embodiment, the plurality of reception coils 80 are formed of eight reception coils disposed along the direction X. The eight reception coils 80 receive changes in the magnetic fluxes in the form of current from the eight scale patterns 4 at the same time. The reception coils 80 each extend toward the rear surface of the insulating substrate 31 and are connected to computation unit 10 (see FIG. 5), which will be described later.

Figure 4:
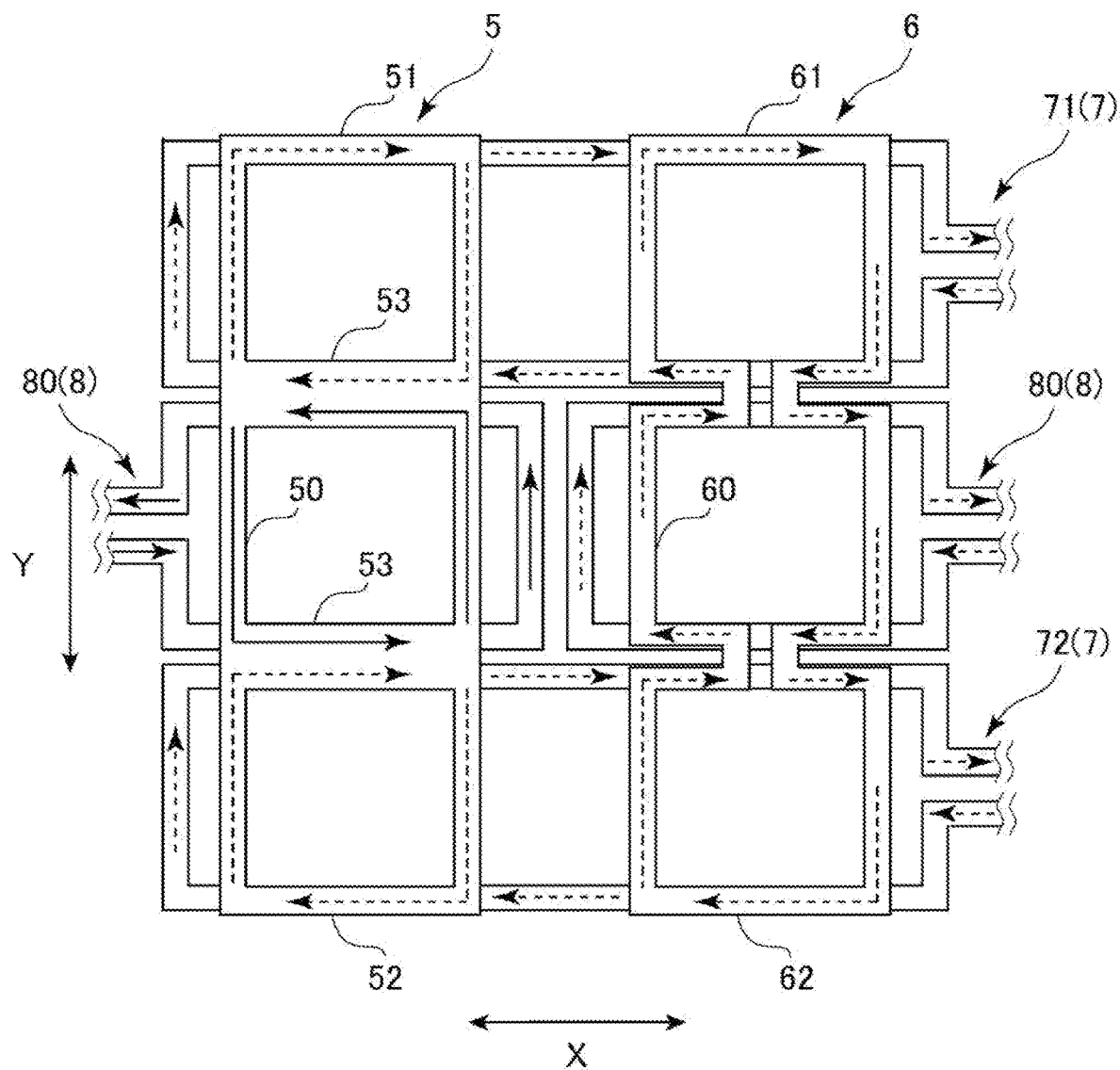
FIG. 4 shows the relationship between the scale and the head according to the first embodiment of the present invention.

FIG. 4 shows the relationship between the scale and the head according to the first embodiment of the present invention. In FIG. 4, one of the first patterns 5 is shown and so is the second patterns 6, and two of the reception coils 80 are shown in correspondence with the first pattern 5 and the second pattern 6 for ease of description. Details of the first patterns 5 and the second patterns 6 on the scale 2 and the transmission coils 71 and 72 and the reception coils 80 in the head 3 will be described with reference to FIG. 4, and the flow of the current will further be described with reference thereto.

The scale patterns 4 each have the first pattern 5, which causes the corresponding reception coil 80 to receive positive current flowing in a predetermined direction, and the second pattern 6, which differs from the first pattern 5 and causes the reception coil 80 to receive negative current flowing in the direction opposite the predetermined direction, as shown in FIG. 4.

The first pattern 5 includes transmission-side patterned coils 51 and 52, which are each formed of a coil wire in a ring shape and are so disposed as to face the transmission coils 71 and 72, and a reception-side patterned coil 50, which is formed of a coil wire in a ring shape and so disposed as to face the corresponding reception coil 80.

The second pattern 6 includes transmission-side patterned coils 61 and 62, which are each formed of a coil wire in a ring shape and are so disposed as to face the transmission coils 71 and 72, and a reception-side patterned coil 60, which is formed of a coil wire in a ring shape and so disposed as to face the corresponding reception coil 80.

The transmission-side patterned coils 51, 52, 61, and 62 and the reception-side patterned coils 50 and 60 are provided in correspondence with the transmission coils 71 and 72 and the reception coils 80 and connected to each other so that the number of transmission-side and reception-side patterned coils is the same as the number of transmission coils and reception coils. The transmission-side patterned coils 51, 52, 61, and 62 and the reception-side patterned coils 50 and 60 are each formed in a substantially rectangular shape. The transmission-side patterned coils 51, 52, 61, and 62 and the reception-side patterned coils 50 and 60 may not each have a substantially rectangular shape and may have any shape as long as they are each formed in a ring shape.

The first pattern 5 causes the coil wires of the transmission-side patterned coils 51 and 52 to be connected to the coil wire of the reception-side patterned coil 50 to form the transmission-side patterned coils 51 and 52 and the reception-side patterned coil 50 in a substantially 8-letter shape. The first pattern therefore has connection regions 53 formed therein.

The second pattern 6 causes the coil wires of the transmission-side patterned coils 61 and 62 to be connected to the coil wire of the reception-side patterned coil 60 to form the transmission-side patterned coils 61 and 62 and the reception-side patterned coil 60 in a substantially 8-letter shape, and the regions where the transmission-side patterned coils 61 and 62 and the reception-side patterned coil 60 are connected to each other, that is, the regions corresponding to the connection regions 53 in the first pattern 5 are removed so that the transmission-side patterned coils 61 and 62 and the reception-side patterned coil 60 are formed in a substantially 0-letter shape (or single annular shape).

In the present embodiment, the second pattern 6 (transmission-side patterned coils 61 and 62 and reception-side patterned coil 60) is so formed along the transmission coils 71 and 72 and the corresponding reception coil 80 as to have a more portion facing the transmission coils 71 and 72 and the reception coil 80, so that the second pattern 6 readily produces electromotive current when it receives the magnetic fluxes from the transmission coils 71 and 72, and that the reception coil 80 readily receives, in the form of current, changes in the magnetic fluxes created by the electromotive current. To this end, the second pattern 6 is formed in a substantially gourd shape, but the second pattern may have any shape that has a region facing the transmission coils and the reception coil, receives the magnetic fluxes from the transmission coils to produce electromotive current, allows the reception coil to receive, in the form of current, changes in the magnetic fluxes created by the electromotive current, and is formed in a substantially 0-letter shape.

The reception-side patterned coil 50 in the first pattern 5, which does not face the transmission coil 71 or 72, produces no electromotive current. However, the reception-side patterned coil 50, which is connected to the transmission-side patterned coils 51 and 52 via the connection regions 53, is affected at the connection regions 53 by the current flowing through the transmission-side patterned coils 51 and 52 so that current flows through the reception-side patterned coil 50. Specifically, current flows through the reception-side patterned coil 50 in the direction indicated by the solid arrows in FIG. 4 and opposite the direction in which the current flows through the transmission-side patterned coils 51 and 52. The present embodiment will be described on the assumption that the current flowing through the reception-side patterned coil 50 in the direction indicated by the solid arrows is "positive current."

Similarly, the reception-side patterned coil 60 in the second pattern 6, which does not face the transmission coil 71 or 72, produces no electromotive current. However, since the reception-side patterned coil 60, which is connected to the transmission-side patterned coils 61 and 62 and has no region corresponding to the connection regions 53 in the first pattern 5, current flows in the same direction in which the current flows through the transmission-side patterned coils 61 and 62. Specifically, current flows through the reception-side patterned coil 60 in the direction indicated by the broken arrows in FIG. 4 and the same direction in which the current flows through the transmission-side patterned coils 61 and 62. The present embodiment will be described on the assumption that the current flowing through the reception-side patterned coil 60 in the direction indicated by the broken arrows is "negative current."

Figure 5:
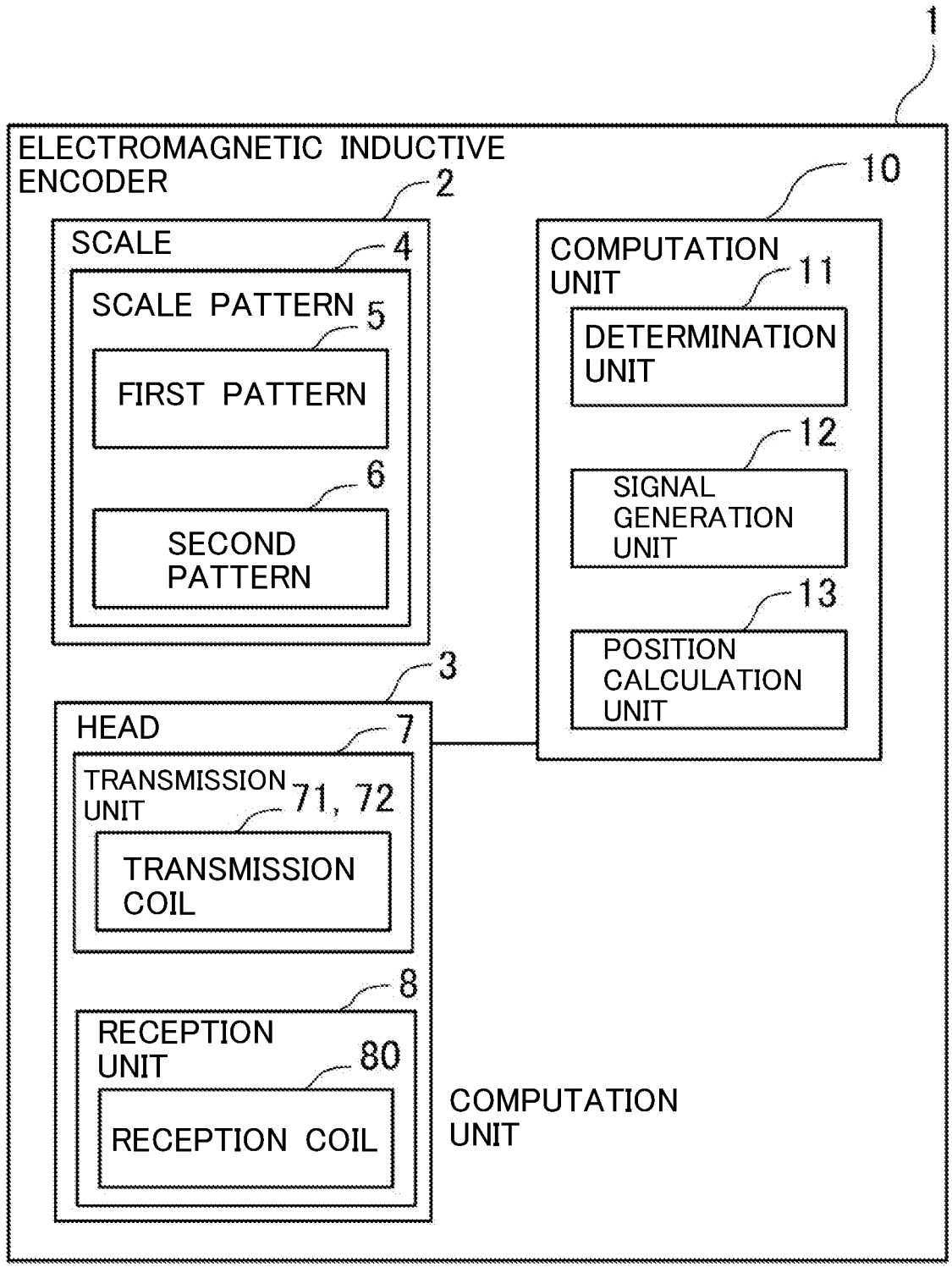
FIG. 5 is a block diagram showing the electromagnetic inductive encoder according to the first embodiment of the present invention.

FIG. 5 is a block diagram showing the electromagnetic inductive encoder according to the first embodiment of the present invention. The electromagnetic inductive encoder 1 further includes the computation unit 10 for computing a signal based on the relative movement between the scale 2 and the head 3, as shown in FIG. 5. The computation unit 10 includes a determination unit 11, a signal generation unit 12, and a position calculation unit 13.

The determination unit 11, when the positive current is detected, determines that the current is associated with the first pattern 5, and, when the negative current is detected, determines that the current is associated with the second pattern 6. The signal generation unit 12 generates a signal formed of "1" representing the first pattern 5 and "0" representing the second pattern 6 based on the result determined by the determination unit 11. The position calculation unit 13 calculates the absolute position of the head 3 relative to the scale 2 based on the signal generated by the signal generation unit 12.

The scale patterns 4 are so disposed along the direction X across the overall length of one track 40 (see FIG. 2) that the first patterns 5 and the second patterns 6 express the absolute position in accordance with an M-sequence code (pseudo-random code). The computation unit 10 analyzes the M-sequence code, which is a pseudo-random code, to calculate the absolute position of the head 3 relative to the scale 2.

The M-sequence code (maximal-length-sequence code) is a code having the longest cycle as compared with the other codes out of the series produced from the signal formed of "1" and "0" received by the reception coils 80. The scale patterns 4, which are so disposed as to express the absolute position in accordance with the M-sequence code, can therefore form the longer track 40 (see FIG. 2) than in a case where any other pseudo-random code is employed.

In a method for analyzing the absolute position, the transmission unit 7 transmits magnetic fluxes to the eight scale patterns 4 to cause them to produce electromotive current, and the eight reception unit 8 receive, in the form of current, changes in the magnetic fluxes created by the electromotive current and sent from the eight scale patterns 4 at the same time, as shown, for example, in FIGS. 1 and 3. The signal generation unit 12 then generates a signal formed, for example, of a binary pattern "01011101." When the head 3 is moved relative to the scale 2, the signal generation unit 12 generates signals formed of different codes, such as "10111011" and "01110111," whenever the head 3 moves by the amount corresponding to one scale pattern 4. The position calculation unit 13 calculates the absolute position of the head 3 based on the signal generated by the signal generation unit 12.

Figure 6:
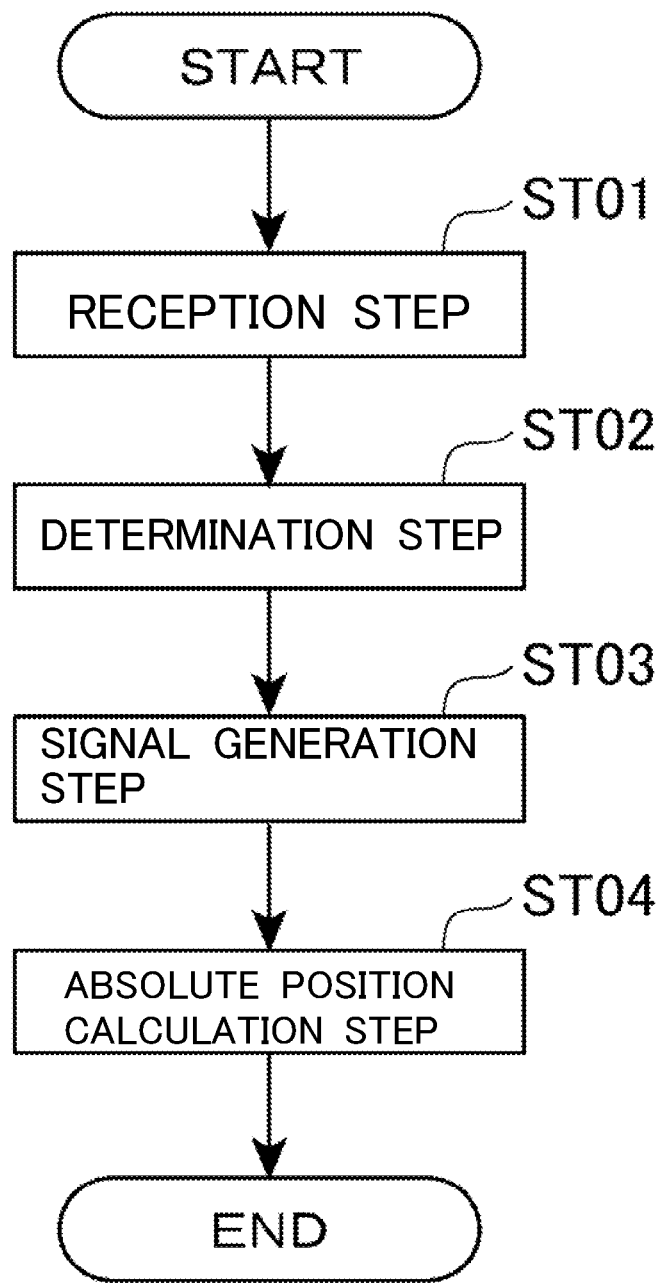
FIG. 6 is a flowchart of computation performed by computation unit according to the first embodiment of the present invention.

FIG. 6 is a flowchart of the computation performed by the computation unit according to the first embodiment of the present invention. The method for calculating the absolute position of the head 3 relative to the scale 2 will be described below with reference to FIG. 6.

The electromagnetic inductive encoder 1 first carries out a reception step (step ST01) of moving the head 3 relative to the scale 2 therealong, as shown in FIG. 6, causing the transmission unit 7 to transmit magnetic fluxes to the first patterns 5 and the second patterns 6 to cause them to produce electromotive current, and causing the reception unit 8 to receive, in the form of current, changes in the magnetic fluxes created by the electromotive current and sent from the first patterns 5 and the second patterns 6. In this step, the reception unit 8 receives a necessary number (number of reception coils 80) of changes in the magnetic fluxes from the scale patterns 4 (first patterns 5 and second patterns 6), the number of which is a number necessary for analysis of the M-sequence code. For example, in the case where eight reception coils 80 are provided, as shown in FIG. 3, the reception unit 8 receives changes in the magnetic fluxes from eight scale patterns 4.

The determination unit 11 then, based on the current received by the reception unit 8, carries out a determination step (step ST02). When the positive current is detected, the determining unit 11 determines that the current is associated with the first pattern 5, and, when the negative current is detected, the determining unit 11 determines that the current is associated with the second pattern 6. The signal generation unit 12 subsequently carries out a signal generation step (step ST03) of generating a signal formed of "1" representing the first pattern 5 and "0" representing the second pattern 6 based on the result determined in the determination step.

In this step, for example, in the case where the eight reception coils 80 receive changes in the magnetic fluxes from the eight scale patterns 4 in the reception step, the signal generation unit 12 generates a signal formed, for example, of a binary pattern "01011101" based on the result of the determination in the determination step. The position calculation unit 13 carries out an absolute position calculation step (step ST04) of calculating the absolute position based on the signal generated by the signal generation unit 12 to calculate the absolute position of the head 3 relative to the scale 2.

The present embodiment described above can provide the following effects:

(1) The determination unit 11 can, when the positive current is detected from the scale patterns 4, determines that the current is associated with the first pattern 5, and, when the negative current is detected therefrom, determines that the current is associated with the second pattern 6. The signal generation unit 12 can generate a signal formed of "1" representing the first pattern 5 and "0" representing the second pattern 6 based on the result of the determination. The position calculation unit 13 can calculate the position of the head 3 based on the signal. The electromagnetic inductive encoder 1 can acquire the signal formed of "1" and "0" from one track 40 formed of the scale patterns 4, which each have the first pattern 5 and the second pattern 6, juxtaposed along the measurement direction.

(2) Since the scale patterns 4 are so disposed across the overall length of one track 40 as to express the absolute position in accordance with an M-sequence code, the electromagnetic inductive encoder 1 can calculate the absolute position of the head 3 relative to the scale 2 from one track 40 by acquiring and analyzing the M-sequence code, which is a combination of "1" and "0" in the signal formed of plurality of "1" and "0". The electromagnetic inductive encoder 1 therefore allows reduction in the number of tracks on the scale 2 for reduction in the size of the scale 2. Further, the reduction in size of the scale 2 allows cost reduction.

(3) Since the transmission unit 7 transmits magnetic fluxes to the plurality of scale patterns 4 to cause them to produce electromotive current, and the reception unit 8 receives, in the form of current, changes in the magnetic fluxes created by the electromotive current and sent from the plurality of scale patterns 4, the reception unit 8 can receive, in the form of current, changes in the plurality of magnetic fluxes from the plurality of scale patterns 4 at the same time.

(4) The electromagnetic inductive encoder 1 allows easy implementation of the first patterns 5, which cause each of the reception coils 80 to receive the positive current flowing in the predetermined direction, and the second patterns 6, which cause each of the reception coils 80 to receive the negative current flowing in the direction opposite the predetermined direction.

(5) Since the reception-side patterned coil 50 in each of the first patterns 5 is sandwiched between the transmission-side patterned coils 51 and 52, and the connection regions 53, where the transmission-side patterned coils 51 and 52 are connected to the reception-side patterned coil 50, are formed of two connection regions 53, the number of magnetic fluxes that the corresponding reception coil 80 can receive increases, as compared with a case where one connection region 53 is provided. The corresponding reception coil 80 therefore readily receives the magnetic flux. Further, since the reception-side patterned coil 60 in each of the second patterns 6 is sandwiched between the transmission-side patterned coils 61 and 62 facing the transmission coils 71 and 72, the electromotive current increases, as compared with a case where one transmission-side patterned coil is provided. The corresponding reception coil 80 therefore readily receives the magnetic flux. The electromagnetic inductive encoder 1 therefore has improved signal efficiency.

(6) Since the transmission-side patterned coils 51, 52, 61, and 62 and the reception-side patterned coils 50 and 60 are so connected to each other along the orthogonal direction as to match with the transmission coils 71 and 72 and the reception coils 80 in terms of number, the arrangement of the transmission-side patterned coils 51, 52, 61, and 62 and the reception-side patterned coils 50 and 60 can be easily designed.

(7) Since the scale patterns 4 are so disposed that the first patterns 5 and the second patterns 6 express the absolute position in accordance with an M-sequence code, the electromagnetic inductive encoder 1 can readily calculate the absolute position, as compared with a case where any other pseudo-random code is used.

Second Embodiment

A second embodiment of the present invention will be described below with reference to FIGS. 7 and 8. In the following description, a portion having already been described has the same reference character and will not be described.

Figure 7:
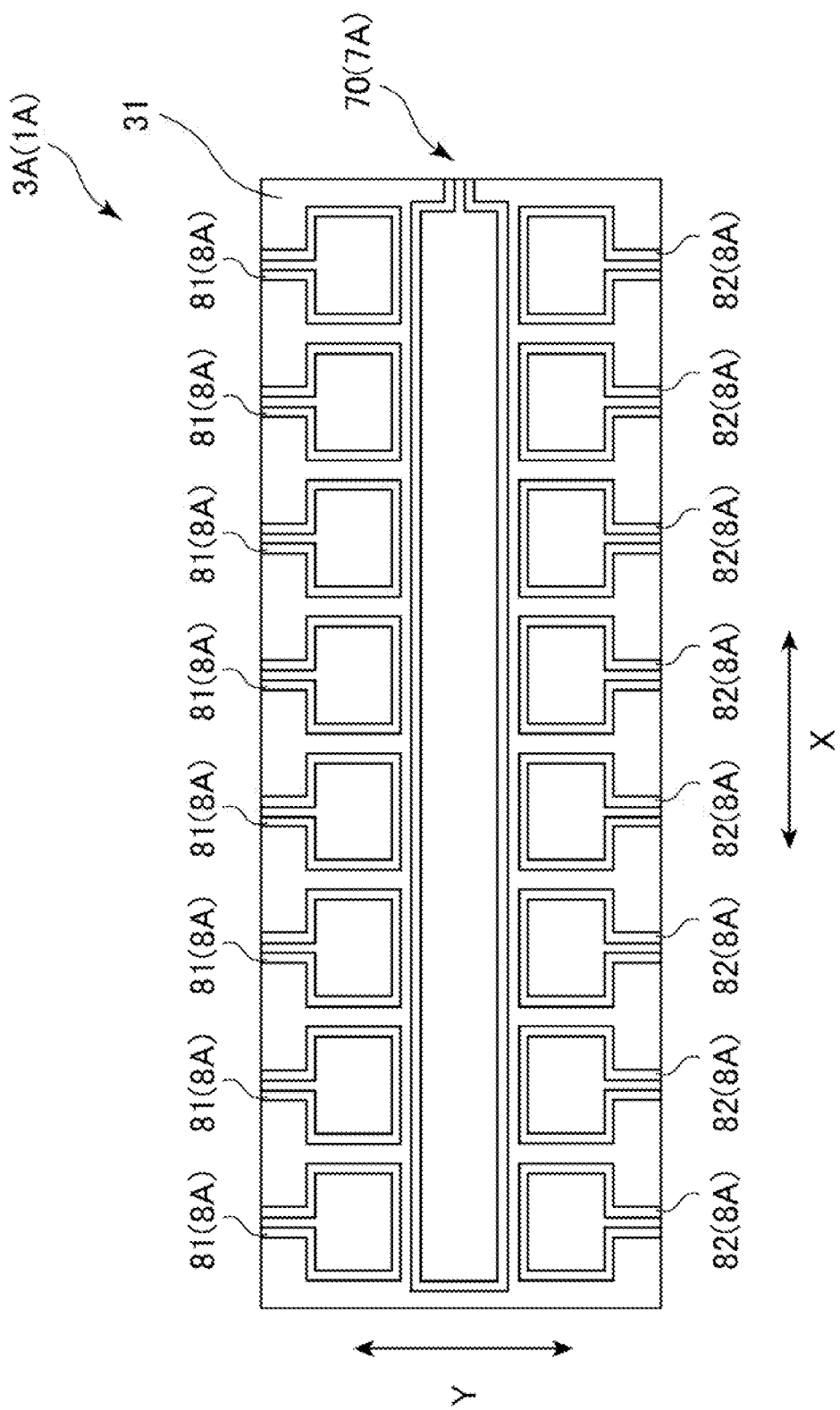
FIG. 7 is a top view showing a head according to a second embodiment of the present invention.

FIG. 7 is a top view showing a head according to the second embodiment of the present invention. An electromagnetic inductive encoder 1A according to the present embodiment has substantially the same configuration as that of the electromagnetic inductive encoder 1 according to the first embodiment described above except a head 3A.

The reception unit 8 in the electromagnetic inductive encoder 1 according to the first embodiment described above are so juxtaposed in the direction Y with the transmission unit 7 as to be sandwiched between the transmission unit 7, as shown in FIG. 3. Reception unit 8A of the head 3 in the electromagnetic inductive encoder 1A according to the present embodiment differs from the first embodiment described above in that the reception unit 8A are so juxtaposed in the direction Y with transmission unit 7A that first reception coils 81 and second reception coils 82 sandwich a transmission coil 70 of the transmission unit 7A, as shown in FIG. 7.

Figure 8:
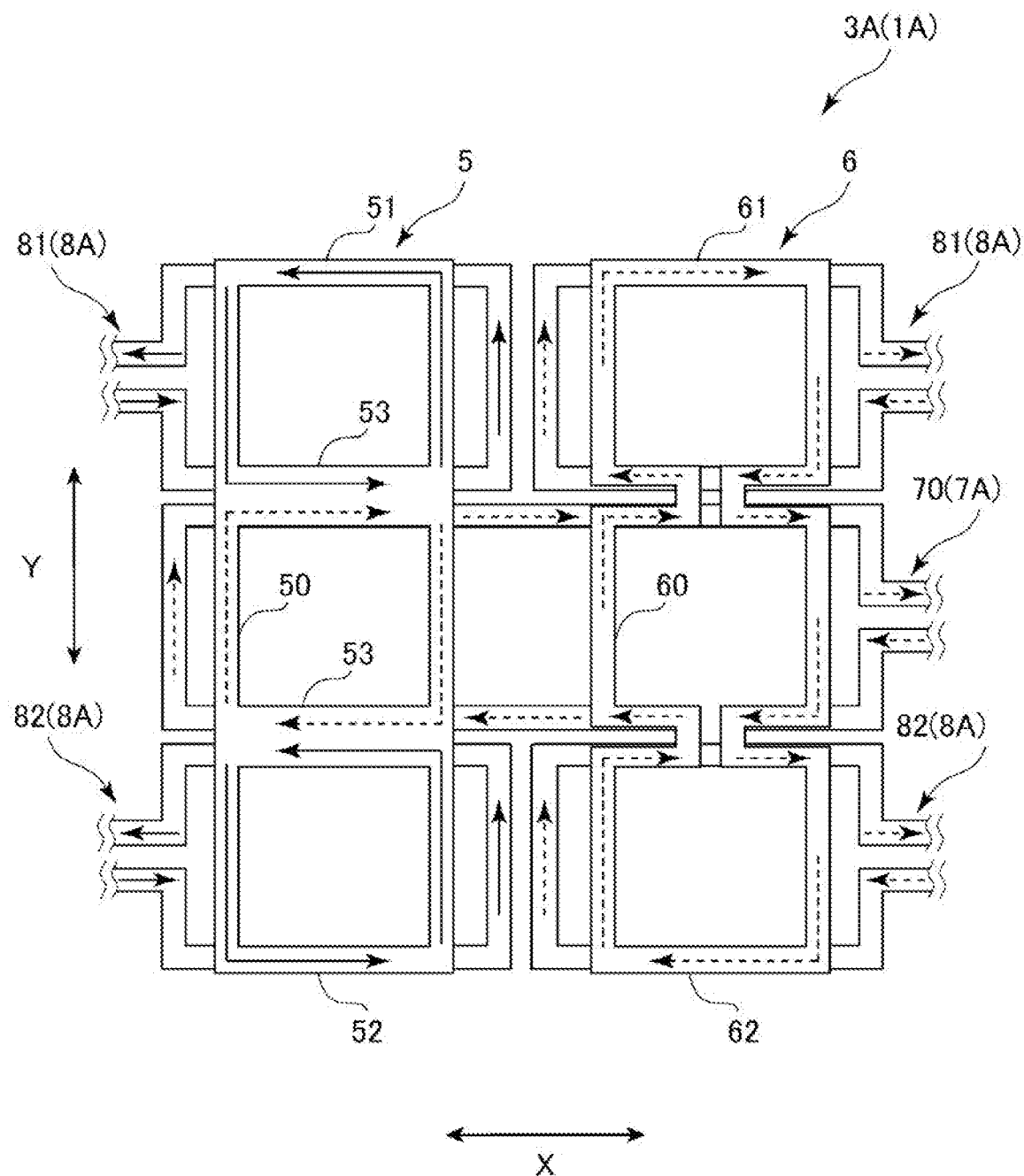
FIG. 8 shows the relationship between the scale and the head according to the second embodiment of the present invention.

FIG. 8 shows the relationship between the scale and the head according to the second embodiment of the present invention. Since the reception unit 8A of the head 3A in the electromagnetic inductive encoder 1A are so juxtaposed in the direction Y with the transmission unit 7A that the first reception coils 81 and the second reception coils 82 sandwich the transmission coil 70 of the transmission unit 7A, the transmission-side patterned coils 51, 52, 61, and 62 and the reception-side patterned coils 50 and 60 in the first patterns 5 and the second patterns 6 in the first embodiment described above function differently from those in the first embodiment described above, as shown in FIG. 8.

That is, the transmission-side patterned coils 51 and 52 in each of the first patterns 5 in the first embodiment function as reception-side patterned coils 51 and 52 in the present embodiment, and the reception-side patterned coil 50 in each of the first patterns 5 in the first embodiment functions as a transmission-side patterned coil 50 in the present embodiment.

Similarly, the transmission-side patterned coils 61 and 62 in each of the second patterns 6 in the first embodiment function as reception-side patterned coils 61 and 62 in the present embodiment, and the reception-side patterned coil 60 in each of the second patterns 6 in the first embodiment functions as a transmission-side patterned coil 60 in the present embodiment.

Also in the present embodiment described above, the same effects (1) to (7) in the first embodiment described above can be provided, and the following effects can be provided.

(8) The arrangement of the transmission coil 70 and the reception coils 81 and 82 causes the transmission-side patterned coils 50 and 60 to be sandwiched between the reception-side patterned coils 51, 52, 61, and 62. The reception coils 81 and 82 can therefore receive the magnetic fluxes at two locations. The electromagnetic inductive encoder 1A therefore has improved signal efficiency.

(9) Since the reception unit 8A are disposed on the opposite end sides in the orthogonal direction (direction Y) of the insulating substrate 31, the reception unit 8A can be readily connected to the computation unit 10, as compared with the reception unit 8 in the first embodiment. The head 3A can therefore be readily manufactured, as compared with the reception unit 8 in the first embodiment.

Variations of Embodiment

The present invention is not limited to the embodiments described above, and variations, improvements, and other modifications to the extent that the object of the present invention can be achieved fall within the scope of the present invention. For example, in the embodiments described above, the electromagnetic inductive encoders 1 and 1A are used in a linear scale as a measurement tool and may instead be used in other measurement tools, such as a dial gauge (test indicator) and a micrometer. That is, the electromagnetic inductive encoders are each not particularly restricted in terms of model and system of a measurement tool in which the electromagnetic inductive encoder is used and can be used in other measurement tools, and an apparatus into which any of the electromagnetic inductive encoders according to the present invention is incorporated is not particularly limited to a specific apparatus. Further, the electromagnetic inductive encoders may each be used in an apparatus other than a measurement tool, such as a sensor.

In the embodiments described above, the electromagnetic inductive encoders 1 and 1A are each a linear encoder and may instead each be a rotary encoder.

In the first embodiment described above, the head 3 includes two transmission unit 7 (transmission coils 71 and 72) and one reception unit 8, and in the second embodiment, the head 3A includes one transmission unit 7A (transmission coil 70) and two reception unit 81 and 82, with the transmission unit and the reception unit so disposed that the total number thereof is odd. Instead, the transmission unit and the reception unit may be so disposed that the total number thereof is even. In short, the head only needs to include transmission unit and reception unit.

Further, in the embodiments described above, the transmission unit 7 and 7A and the reception unit 8 and 8A are alternately disposed, and the transmission unit and the reception unit are not necessarily alternately disposed. Still further, in the embodiments described above, the reception coils 80, 81, and 82 are each formed of eight reception coils in the heads 3 and 3A, and the number of reception coils can be arbitrarily determined in accordance with the pseudo-random code to be employed for analyzing the absolute position. Further, the transmission coils 70, 71, and 72 transmit magnetic fluxes to the eight scale patterns 4 to cause them to produce the electromotive current and may instead transmit magnetic fluxes to an arbitrary number of scale patterns to cause them to produce the electromotive current. In short, the transmission unit only needs to transmit a magnetic flux to any of the scale patterns to cause it to produce electromotive current, and the reception unit only needs to receive, in the form of current, a change in the magnetic flux created by the electromotive current and sent from the scale pattern.

In the embodiments described above, the scale patterns 4 are so disposed that the first patterns 5 and the second patterns 6 express the absolute position in accordance with an M-sequence code, and the absolute position is not necessarily expressed by an M-sequence code and may instead be expressed by any other pseudo-random code, or another system may be employed. Further, the computation unit 10 analyzes the M-sequence codes to calculate the absolute position of the head 3 relative to the scale 2, and the computation unit may instead use any computation method or analysis approach that allows computation of a signal based on the relative movement between the scale and the head.

In the embodiments described above, the first patterns 5 and the second patterns 6 are so disposed across the track 40 as to form an ABS pattern, and the first patterns and the second patterns may not be so disposed across the track as to form an ABS pattern. For example, in one track, the first patterns and the second patterns may be alternately so disposed to form an INC pattern, or the first patterns and the second patterns may be so disposed as to form an ABS-system area disposed in correspondence with a pseudo-random code and an INC-system area disposed as an INC pattern. In short, the scale patterns each only need to have a first pattern that causes the corresponding reception coil to receive the positive current flowing in the predetermined direction and a second pattern that differs from the first pattern and causes the corresponding reception coil to receive the negative current flowing in the direction opposite the predetermined direction.

In the embodiments described above, the connection regions 53 in each of the first patterns 5 are each formed in a linear shape and may instead be formed of a point. In short, the first patterns each only need to be formed by connecting the coil wires of the transmission-side patterned coils to the coil wire of the reception-side patterned coil to form the transmission-side patterned coils and the reception-side patterned coil in a substantially 8-letter shape. Further, the second patterns 6 are each formed in a substantially gourd shape and may instead be formed in any shape as long as the coil wires of the transmission-side patterned coils are connected to the coil wire of the reception-side patterned coil to form a substantially 0-letter shape (or single annular shape). Such substantially 0-letter shape may be formed by connecting the transmission-side patterned coils and the reception-side patterned coil in a substantially 8-letter shape and removing the regions where the transmission-side patterned coils are connected to the reception-side patterned coil.

In the embodiments described above, the positive current is the current flowing in the predetermined direction in the first patterns 5, the negative current is the current flowing in the predetermined direction in the second patterns 6, and the signal generation unit 12 assigns "1" to a signal resulting from any of the first patterns 5 and "0" to a signal resulting from any of the second patterns 6. Instead, the negative current may be the current flowing in the predetermined direction in the first patterns, the positive current may be the current flowing in the predetermined direction in the second patterns, and the signal generation unit may assign "0" to a signal resulting from any of the first patterns and "1" to a signal resulting from any of the second patterns. Still instead, the positive current may be the current flowing in the predetermined direction in the first patterns, the negative current may be the current flowing in the predetermined direction in the second patterns, and the signal generation unit may assign "0" to a signal resulting from any of the first patterns and "1" to a signal resulting from any of the second patterns. Still further instead, the negative current may be the current flowing in the predetermined direction in the first patterns, the positive current may be the current flowing in the predetermined direction in the second patterns, and the signal generation unit 12 may assign "1" to a signal resulting from any of the first patterns 5 and "0" to a signal resulting from any of the second patterns 6. "1" and "0" may be replaced with arbitrary codes. The items described above are design items, and the direction of the current and "0" and "1" can be arbitrarily set.

INDUSTRIAL APPLICABILITY

As described above, the present invention is suitably applicable to an electromagnetic inductive encoder.

What is claimed is:

1. An electromagnetic inductive encoder comprising: a scale that has a scale pattern provided along a measurement direction; a head that faces the scale and moves relative thereto in the measurement direction; and computation unit for computing a signal based on the relative movement between the scale and the head,
    wherein the head includes
    a transmission unit including a transmission coil that transmits a magnetic flux to the scale pattern to cause the scale pattern to produce electromotive current, and
    a reception unit including a reception coil that receives, in a form of current, a change in the magnetic flux created by the electromotive current and sent from the scale pattern,
    the scale pattern has
    a first pattern that causes the reception coil to receive positive current flowing in a predetermined direction and
    a second pattern that differs from the first pattern and causes the reception coil to receive negative current flowing in a direction opposite the predetermined direction,
    the computation unit includes
    a determination unit that, when the positive current is detected, determines that the current is associated with the first pattern, and, when the negative current is detected, determines that the current is associated with the second pattern,
    a signal generation unit that generates a signal formed of "1" representing the first pattern and "0" representing the second pattern based on a result determined by the determination unit, and
    a position calculation unit that calculates a position of the head based on the signal generated by the signal generation unit,
    the transmission coil is disposed along the measurement direction as to extend over the scale patterns,
    a plurality of the reception coils is disposed along the measurement direction as to correspond to the scale patterns and juxtaposed with the transmission coil on a surface where the transmission coil is disposed and in an orthogonal direction orthogonal to the measurement direction,
    the first and second patterns each include
    a transmission-side patterned coil that is formed of a coil wire in a ring shape and so disposed as to face the transmission coil, and
    a reception-side patterned coil that is formed of a coil wire in a ring shape and so disposed as to face the reception coils,
    the first pattern is formed by connecting the coil wire of the transmission-side patterned coil to the coil wire of the reception-side patterned coil to form the transmission-side patterned coil and the reception-side patterned coil in a substantially 8-letter shape,
    the second pattern is formed by connecting the coil wire of the transmission-side patterned coil to the coil wire of the reception-side patterned coil to form the transmission-side patterned coil and the reception-side patterned coil in a substantially 8-letter shape and removing a region where the transmission-side patterned coil is connected to the reception-side patterned coil to form the transmission-side patterned coil and the reception-side patterned coil in a substantially 0-letter shape,
    the transmission coil and the reception coils are alternately so juxtaposed along the orthogonal direction that the total number thereof is odd, and
    the transmission-side patterned coil and the reception-side patterned coil are alternately connected to each other along the orthogonal direction that the total number thereof is odd.

2. The electromagnetic inductive encoder according to claim 1,
    the transmission unit transmits a magnetic flux to a plurality of the scale patterns to cause the scale patterns to produce electromotive current,
    the reception unit receives, in the form of current, changes in the magnetic flux created by the electromotive current and sent from the plurality of scale patterns, and
    the scale patterns are se disposed that the first and second patterns express an absolute position in accordance with a pseudo-random code.

3. The electromagnetic inductive encoder according to claim 1,
    wherein the transmission coil and the reception coils are alternately juxtaposed along the orthogonal direction.

4. The electromagnetic inductive encoder according to claim 1,
    wherein the scale patterns are disposed that the first pattern and the second pattern express the absolute position in accordance with an M-sequence code.

5. An electromagnetic inductive encoder comprising: a scale that has a scale pattern provided along a measurement direction; a head that faces the scale and moves relative thereto in the measurement direction; and computation unit for computing a signal based on the relative movement between the scale and the head,
    wherein the head includes
    a transmission unit including a transmission coil that transmits a magnetic flux to the scale pattern to cause the scale pattern to produce electromotive current, and
    a reception unit including a reception coil that receives, in a form of current, a change in the magnetic flux created by the electromotive current and sent from the scale pattern,
    the scale pattern has
    a first pattern that causes the reception coil to receive positive current flowing in a predetermined direction and a second pattern that differs from the first pattern and causes the reception coil to receive negative current flowing in a direction opposite the predetermined direction, the computation unit includes a determination unit that, when the positive current is detected, determines that the current is associated with the first pattern, and, when the negative current is detected, determines that the current is associated with the second pattern, a signal generation unit that generates a signal formed of "1" representing the first pattern and "0" representing the second pattern based on a result determined by the determination unit, and a position calculation unit that calculates a position of the head based on the signal generated by the signal generation unit, the transmission coil is disposed along the measurement direction as to extend over the scale patterns, a plurality of the reception coils is se disposed along the measurement direction as to correspond to the scale patterns and juxtaposed with the transmission coil on a surface where the transmission coil is disposed and in an orthogonal direction orthogonal to the measurement direction, the first and second patterns each include a transmission-side patterned coil that is formed of a coil wire in a ring shape and disposed as to face the transmission coil, and a reception-side patterned coil that is formed of a coil wire in a ring shape and se disposed as to face the reception coils, the first pattern is formed by connecting the coil wire of the transmission-side patterned coil to the coil wire of the reception-side patterned coil to form the transmission-side patterned coil and the reception-side patterned coil in a substantially 8-letter shape, the second pattern is formed by connecting the coil wire of the transmission-side patterned coil to the coil wire of the reception-side patterned coil to form the transmission-side patterned coil and the reception-side patterned coil in a substantially 8-letter shape and removing a region where the transmission-side patterned coil is connected to the reception-side patterned coil to form the transmission-side patterned coil and the reception-side patterned coil in a substantially 0-letter shape, the transmission-side patterned coil and the reception-side patterned coil are connected to each other along the orthogonal direction as to match with the transmission coil and the reception coils in terms of number.

6. The electromagnetic inductive encoder according to claim 5, the transmission unit transmits a magnetic flux to a plurality of the scale patterns to cause the scale patterns to produce electromotive current, the reception unit receives, in the form of current, changes in the magnetic flux created by the electromotive current and sent from the plurality of scale patterns, and the scale patterns are disposed that the first and second patterns express an absolute position in accordance with a pseudo-random code.

7. The electromagnetic inductive encoder according to claim 5, wherein the transmission coil and the reception coils are alternately juxtaposed along the orthogonal direction.

8. The electromagnetic inductive encoder according to claim 5, wherein the transmission coil and the reception coils are alternately juxtaposed along the orthogonal direction that the total number thereof is odd, and the transmission-side patterned coil and the reception-side patterned coil are alternately connected to each other along the orthogonal direction that the total number thereof is odd.

9. The electromagnetic inductive encoder according to claim 5, wherein the scale patterns are disposed that the first pattern and the second pattern express the absolute position in accordance with an M-sequence code.

* * * * *